(12) United States Patent
Mallette et al.

(10) Patent No.: US 11,170,173 B2
(45) Date of Patent: Nov. 9, 2021

(54) ANALYZING CHAT TRANSCRIPT DATA BY CLASSIFYING UTTERANCES INTO PRODUCTS, INTENTS AND CLUSTERS

(71) Applicant: International Business Machines Corporation, Armonk, NY (US)

(72) Inventors: Jennifer A. Mallette, Vienna, VA (US); Steven W. Jones, Astoria, NY (US); Vivek Salve, Poughkeepsie, NY (US); Jia Liu, Astria, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 16/268,349

(22) Filed: Feb. 5, 2019

(65) Prior Publication Data

US 2020/0250277 A1 Aug. 6, 2020

(51) Int. Cl.
*G06F 40/30* (2020.01)
*G06Q 30/02* (2012.01)

(52) U.S. Cl.
CPC ......... *G06F 40/30* (2020.01); *G06Q 30/0201* (2013.01)

(58) Field of Classification Search
CPC ................. G10L 15/1815; G10L 15/1822
USPC ........................................................ 704/9
See application file for complete search history.

(56) References Cited

U.S. PATENT DOCUMENTS

| | | | |
|---|---|---|---|
| 6,393,460 B1 * | 5/2002 | Gruen | G06Q 10/107 709/204 |
| 7,194,536 B2 | 3/2007 | Fellenstein et al. | |
| 9,460,455 B2 | 10/2016 | Hardeniya et al. | |
| 9,661,067 B2 | 5/2017 | Seth et al. | |

(Continued)

FOREIGN PATENT DOCUMENTS

WO 2002093414 A1 11/2002

OTHER PUBLICATIONS

Nandini V., Janani Chitra R. and P. U. Maheswari, "A framework for measuring similarity between terms in Short Text Categorization," 2016 Online International Conference on Green Engineering and Technologies (IC-GET), Coimbatore, 2016, pp. 1-7, doi: 10.1109/GET.2016.7916853. (Year: 2016) (Year: 2016).*

(Continued)

*Primary Examiner* — Bharatkumar S Shah
(74) *Attorney, Agent, or Firm* — Robert A. Voigt, Jr.; Winstead PC (57) ABSTRACT

A method, system and computer program product for improving the understanding of chat transcript data. Chat transcripts are analyzed to classify the utterances into intents and identify products discussed in the chat transcripts. The data of the chat transcripts are divided into categories of utterances associated with products and intents by applying tags to the chat transcripts. The categories of utterances associated with products and intents are then clustered into clusters based on sentence similarity. Once the utterances are grouped, a representative utterance is extracted from a cluster, where the representative utterance is an utterance (Continued)

that has the highest semantic similarity to the utterances in the cluster. In this manner, users will be provided a more accurate guide as to the underlying meaning of the chat transcript data thereby improving the understanding of the chat transcript data more efficiently and accurately than current chat transcript analysis tools.

20 Claims, 8 Drawing Sheets

(56) References Cited

U.S. PATENT DOCUMENTS

| | | | |
|---|---|---|---|
| 2008/0154579 A1 | 6/2008 | Kummamuru | |
| 2012/0130771 A1 | 5/2012 | Kannan et al. | |
| 2014/0195562 A1* | 7/2014 | Hardeniya | G06N 5/022 |
| | | | 707/776 |
| 2014/0222528 A1 | 8/2014 | Chang et al. | |
| 2014/0358631 A1 | 12/2014 | Ghose et al. | |
| 2016/0026962 A1 | 1/2016 | Shankar et al. | |
| 2016/0162474 A1 | 6/2016 | Agarwal et al. | |
| 2018/0032533 A1* | 2/2018 | Singh | G06F 16/355 |
| 2020/0082214 A1* | 3/2020 | Salammagari | H04L 51/02 |

OTHER PUBLICATIONS

Nandini V., Janani Chitra R. and P. U. Maheswari, "A framework for measuring similarity between terms in Short Text Categorization," 2016 Online International Conference on Green Engineering and Technologies (IC-GET), Coimbatore, 2016, pp. 1-7, doi: 10.1109/GET.2016.7916853. (Year: 2016) (Year: 2016) (Year: 2016).*

D. P. Twitchell and J. F. Nunamaker, "Speech act profiling: a probabilistic method for analyzing persistent conversations and their participants," 37th Annual Hawaii International Conference on System Sciences, 2004. Proceedings of the, 2004, pp. 10 pp.-, doi: 10.1109/HICSS.2004.1265283. (Year: 2004).*

* cited by examiner

ANALYZING CHAT TRANSCRIPT DATA BY CLASSIFYING UTTERANCES INTO PRODUCTS, INTENTS AND CLUSTERS

TECHNICAL FIELD

The present invention relates generally to online chat, and more particularly to improving the understanding of chat transcript data by classifying utterances of the chat transcript data into products, intents and clusters.

BACKGROUND

Online chat may refer to any kind of communication over the Internet that offers a real-time transmission of text messages from the sender to the receiver. Chat messages are generally short in order to enable other participants to respond quickly. Thereby, a feeling similar to a spoken conversation is created, which distinguishes chatting from other text-based online communication forms, such as Internet forums and e-mail. Online chat may address point-to-point communications as well as multicast communications from one sender to many receivers and voice and video chat, or may be a feature of a web conferencing service.

Online chat may include text-based or video-based (webcams), one-on-one chat or one-to-many group chat (formally also known as synchronous conferencing), using tools, such as instant messengers, Internet Relay Chat (IRC), talkers and possibly multi-user domains (MUDs). Online chat includes web-based applications that allow communication, which is often directly addressed, but anonymous between users in a multi-user environment.

Transcripts of such online chat sessions ("chat transcripts") contain valuable information. For example, in an online chat session between a customer and an agent, the chat transcript of such an online chat session may include information about the customer's questions about a product or confusion experienced by the customer. For instance, the customer may have questions about how to use the product. In another example, the customer may have confusion about the product's particular features. In a further example, the customer may have confusion about the differences between the versions of the product.

As a result of such valuable information, many different types of users, such as product owners, product managers and marketers, could benefit from accessing such information.

Consequently, users attempt to analyze such chat transcript data, such as by using chat transcript analysis tools. However, such tools simply attempt to summarize the conversation topics. Such analysis fails to provide a complete understanding of the chat transcript data. As a result, users may have to manually analyze the raw transcript data. However, such data is often too large to sift through manually. Furthermore, manual analysis often results in anecdotal conclusions based on a small subset of the data.

SUMMARY

In one embodiment of the present invention, a method for improving understanding of chat transcript data comprises analyzing chat transcripts to classify utterances into intents. The method further comprises analyzing the chat transcripts to identify products discussed in the analyzed chat transcripts. The method additionally comprises dividing data of the chat transcripts into categories of utterances associated with the products and the intents by applying tags to the chat transcripts, where the intents comprise intentions of customers to take particular actions. Furthermore, the method comprises clustering the categories of utterances associated with the products and the intents into clusters based on sentence similarity. Additionally, the method comprises extracting a representative utterance from a cluster, where the representative utterance is an utterance that has a highest semantic similarity to utterances in the cluster.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving the understanding of chat transcript data. In one embodiment of the present invention, chat transcripts are analyzed to classify the utterances into intents. These utterances in the chat transcript may correspond to questions from customers and answers from agents. "Intents," as used herein, refer to the intentions, such as of customers, to take particular actions. For example, the customer may intend to purchase a red jacket. Furthermore, the chat transcripts are analyzed to identify products discussed in the analyzed chat transcripts. Additionally, the data of the chat transcripts are divided into categories of utterances associated with the identified products and the identified intents by applying tags to the chat transcripts. In one embodiment, such tags are applied as filters to divide the data into categories. The categories of utterances associated with products and intents are then clustered into clusters based on sentence similarity. Once the utterances are grouped, a representative utterance (e.g., a summary question from that group) is extracted from a cluster, where the representative utterance is an utterance that has the highest semantic similarity to the utterances in the cluster. In this manner, users will be provided a more accurate guide as to the underlying meaning of the chat transcript data, such as the main question being asked by customers in connection with specific products and intents, thereby improving the understanding of the chat transcript data more efficiently and accurately than current chat transcript analysis tools.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
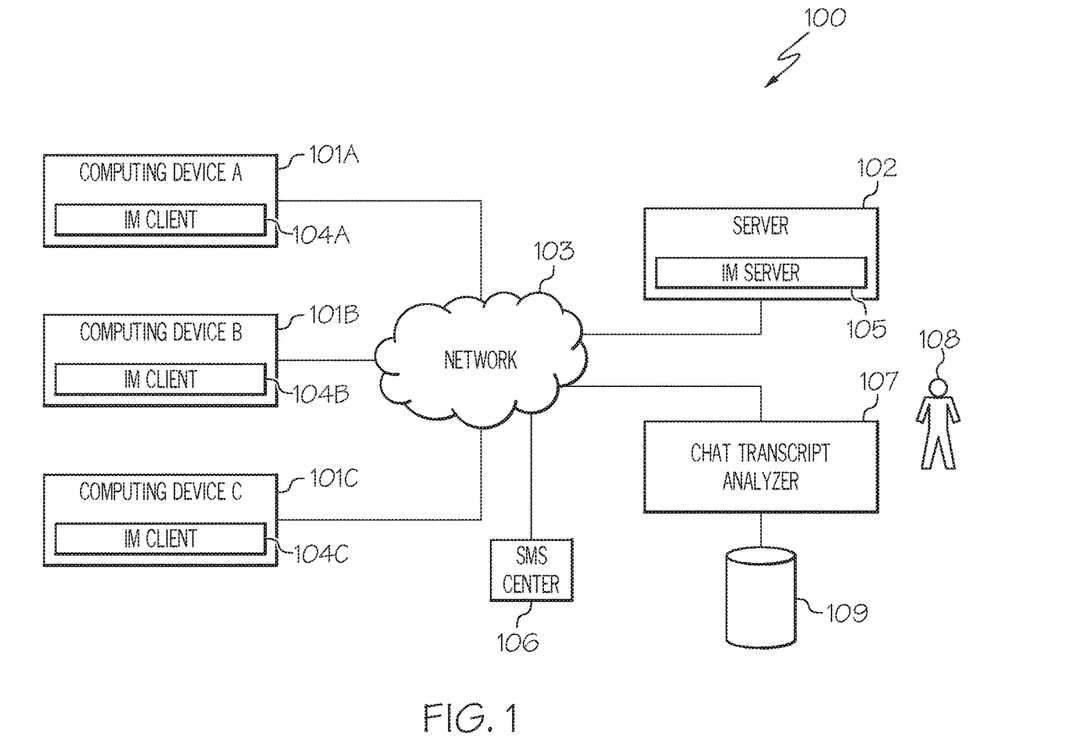
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. Computing device 101 may be any type of computing device (e.g., a portable computing unit, a Personal Digital Assistant (PDA), a mobile device, a tablet personal computer, a smartphone, a laptop computer, a mobile phone, a cellular phone, a navigation device, a gaming unit, a desktop computing device, a workstation, an Internet appliance and the like) configured with the capability of connecting to network 103 and consequently communicating with other computing devices 101 and server 102. Computing device 101 may be configured to send and receive text-based messages in real-time, such as during an instant messaging session or using a Short Message Service (SMS). Any user of computing devices 101 may be the creator or initiator of a text message and any user of computing devices 101 may be a recipient of a text message. It is noted that both computing devices 101 and the users of computing devices 101 may be identified with element number 101. Users of computing devices 101 may correspond to customers, who buys goods or services from a business, or agents, who act on behalf of an organization (e.g., business) or another person.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C may include a software agent, referred to herein as an Instant Messaging (IM) client 104A-104C, respectively. Instant messaging clients 104A-104C may collectively or individually be referred to as instant messaging clients 104 or instant messaging client 104, respectively. Furthermore, server 102 may include a software agent, referred to herein as the Instant Messaging (IM) server 105. IM client 104 provides the functionality to send and receive instant messages. As messages are received, IM client 104 presents the messages to the user in a dialog window (or IM window). Furthermore, IM client 104 provides the functionality for computing device 101 to connect to the IM server 105 which provides the functionality of distributing the instant messages to the IM clients 104 associated with each of the sharing users. "Instant messages," as used herein, include any one or more of the following: text, images, audio, video, etc.

System 100 may further include a Short Message Service (SMC) center 106 configured to relay, store and forward text messages, such as SMS messages, among computing devices 101 through network 103.

Furthermore, system 100 includes what is referred to herein as the "chat transcript analyzer" 107 connected to network 103 by wire or wirelessly. In one embodiment, chat transcript analyzer 107 is configured to monitor communications, such as online communications (e.g., online chat communications) which may include audio conversations (e.g., voice chat). Chat transcript analyzer 107 may utilize transcription software (e.g., IBM Watson®, Express Scribe, Dragon® Naturally Speaking, InqScribe®, Audiotranskription) to convert audio (e.g., human speech from voice chat) into a chat transcript. A "chat transcript," as used herein, refers to a printed version of the online communication between users 101, such as between customers and agents. Furthermore, chat transcription analyzer 107 may utilize transcription software (e.g., Pure Chat®, Salesforce® Live Agent) to generate chat transcripts of online chat sessions (e.g., exchange of text messages between users 101, such as between customers and agents). These chat transcripts, which may include text messages and/or text converted from audio, are analyzed by chat transcript analyzer 107 to divide the data of the chat transcripts into categories of utterances (e.g., questions from customers and answers from agents) associated with products and intents. "Intents," as used herein, refers to the intentions, such as of customers, to take particular actions. For example, the customer may intend to purchase a red jacket. These categories of utterances associated with products and intents may be clustered into clusters based on sentence similarity. Once the utterances are grouped, a representative utterance (e.g., summary question from the group) will be extracted corresponding to the utterance with the highest semantic similarity with all the utterances in the group as discussed further below. A description of the hardware configuration of chat transcript analyzer 107 is provided below in connection with FIG. 2.

System 100 further illustrates a user 108, such as an analyst, that can query chat transcript analyzer 107 for viewing representative utterances (e.g., summary question from customers) for selected products and intents, which provide user 108 with a better understanding of the chat transcript data.

Additionally, system 100 includes a database 109 connected to chat transcript analyzer 107 that stores utterances as well as associated tags that include an utterance (word or statement provided by a user 101, such as a customer or agent) as well as an associated product and intent. For example, the chat transcript may include a question from the customer (customer utterance) regarding what is the link to buy IBM SPSS® software. In this example, the utterance refers to the question regarding the link to buy the software, the product refers to the IBM SPSS® software, and the intent is to buy.

System 100 is not to be limited in scope to any one particular network architecture. System 100 may include any number of computing devices 101, servers 102, networks 103, SMS centers 106, chat transcript analyzers 107, users 108 and databases 109. Furthermore, while FIG. 1 illustrates chat transcript analyzer 107 as being a separate physical device, some or all of the functionality of chat transcript analyzer 107 may reside in computing device 101.

Figure 2:
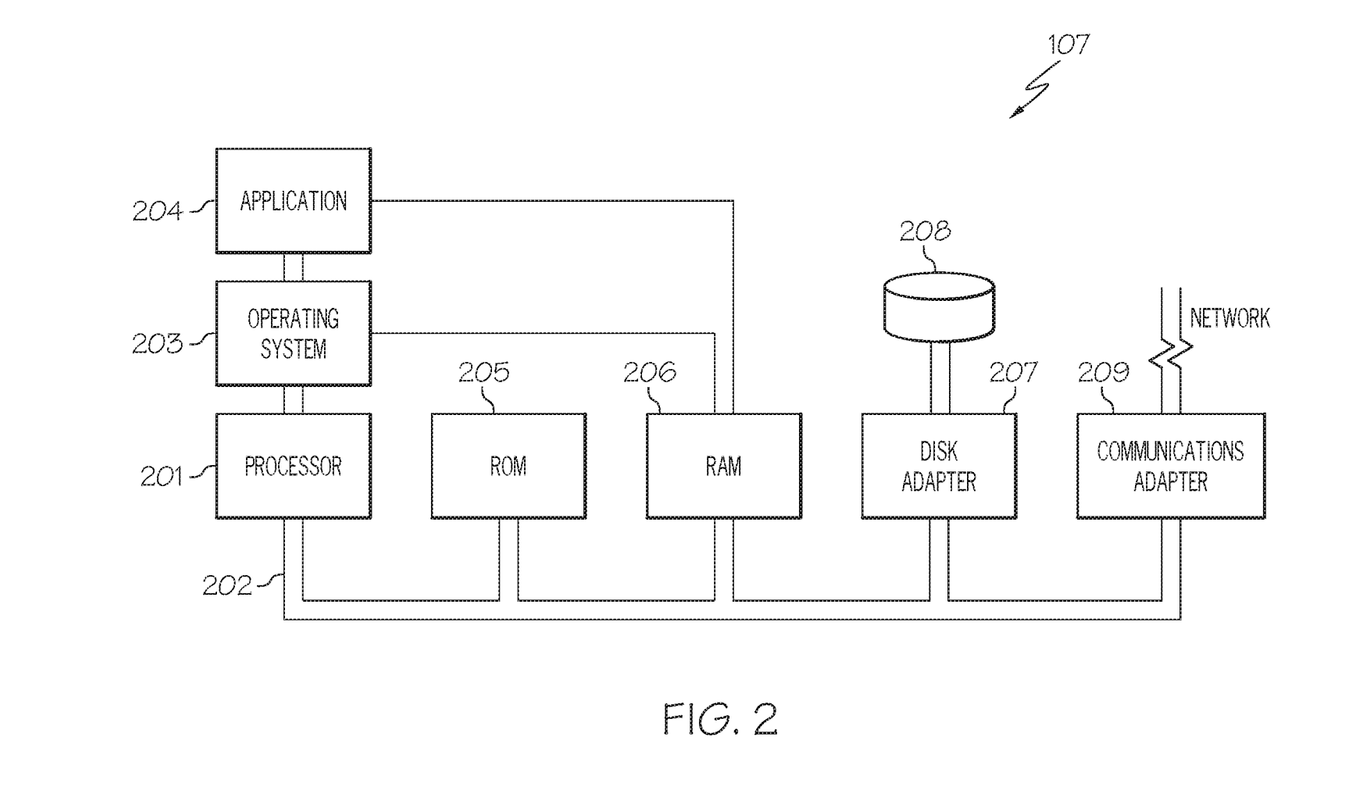
FIG. 2 illustrates an embodiment of the present invention of a hardware configuration of a chat transcript analyzer which is representative of a hardware environment for practicing the present invention.

Referring now to FIG. 2, FIG. 2 illustrates a hardware configuration of chat transcript analyzer 107 (FIG. 1) which is representative of a hardware environment for practicing the present invention. Referring to FIG. 2, chat transcript analyzer 107 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, monitoring software (e.g., Geneysis™ Desktop); transcription software; a natural language classifier; a supervised learning algorithm; a clustering engine; a semantic similarity algorithm, and/or a program for improving the understanding of chat transcript data by classifying utterances of the chat transcript data into products, intents and clusters, as discussed below in connection with FIGS. 3-10.

Referring again to FIG. 2, read-only memory ("ROM") 205 is connected to system bus 202 and includes a basic input/output system ("BIOS") that controls certain basic functions of chat transcript analyzer 107. Random access memory ("RAM") 206 and disk adapter 207 are also connected to system bus 202. It should be noted that software components including operating system 203 and application 204 may be loaded into RAM 206, which may be chat transcript analyzer's 107 main memory for execution. Disk adapter 207 may be an integrated drive electronics ("IDE") adapter that communicates with a disk unit 208, e.g., disk drive. It is noted that the program for improving the understanding of chat transcript data by classifying utterances of the chat transcript data into products, intents and clusters, as discussed below in connection with FIGS. 3-10, may reside in disk unit 208 or in application 204.

Chat transcript analyzer 107 may further include a communications adapter 209 connected to bus 202. Communications adapter 209 interconnects bus 202 with an outside network (e.g., network 103 of FIG. 1) thereby allowing chat transcript analyzer 107 to communicate with computing devices 101 and server 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, transcripts of online chat sessions ("chat transcripts") contain valuable information. For example, in an online chat session between a customer and an agent, the chat transcript of such an online chat session may include information about the customer's questions about a product or confusion experienced by the customer. For instance, the customer may have questions about how to use the product. In another example, the customer may have confusion about the product's particular features. In a further example, the customer may have confusion about the differences between the versions of the product. As a result of such valuable information, many different types of users, such as product owners, product managers and marketers, could benefit from accessing such information. Consequently, users attempt to analyze such chat transcript data, such as by using chat transcript analysis tools. However, such tools simply attempt to summarize the conversation topics. Such analysis fails to provide a complete understanding of the chat transcript data. As a result, users may have to manually analyze the raw transcript data. However, such data is often too large to sift through manually. Furthermore, manual analysis often results in anecdotal conclusions based on a small subset of the data. As a result, there is not currently a means for effectively understanding and analyzing chat transcript data.

Figure 3:
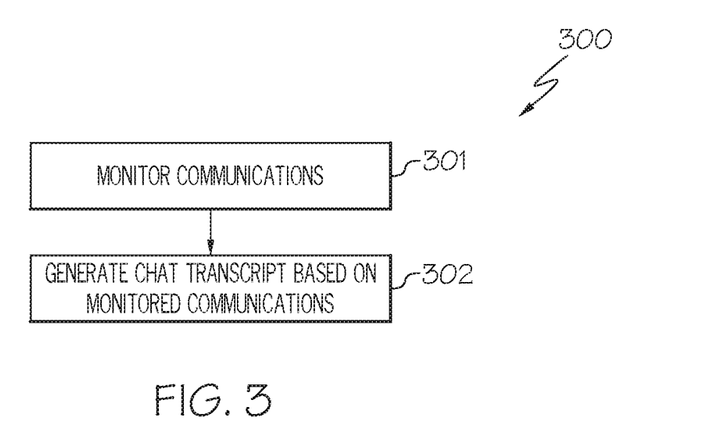
FIG. 3 is a flowchart of a method for generating a chat transcript in accordance with an embodiment of the present invention.
Figure 4:
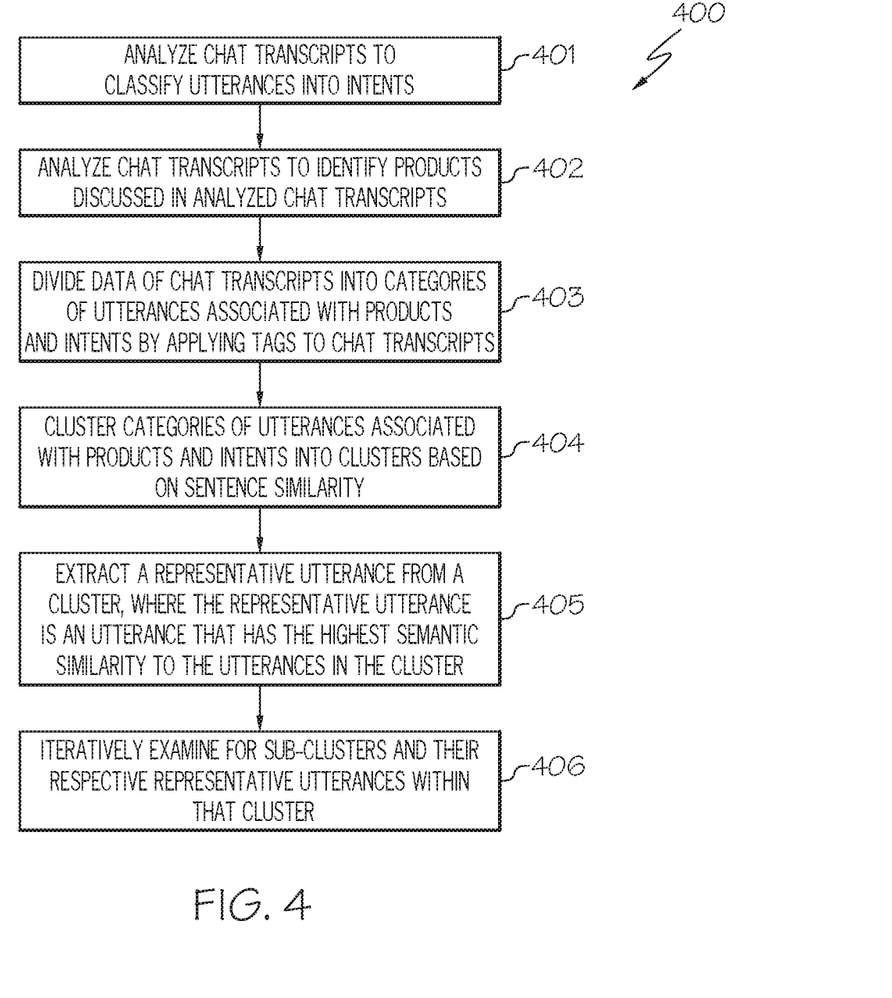
FIG. 4 is a flowchart of a method for improving the understanding of chat transcript data by classifying utterances of the chat transcript data into products, intents and clusters in accordance with an embodiment of the present invention.
Figure 5:
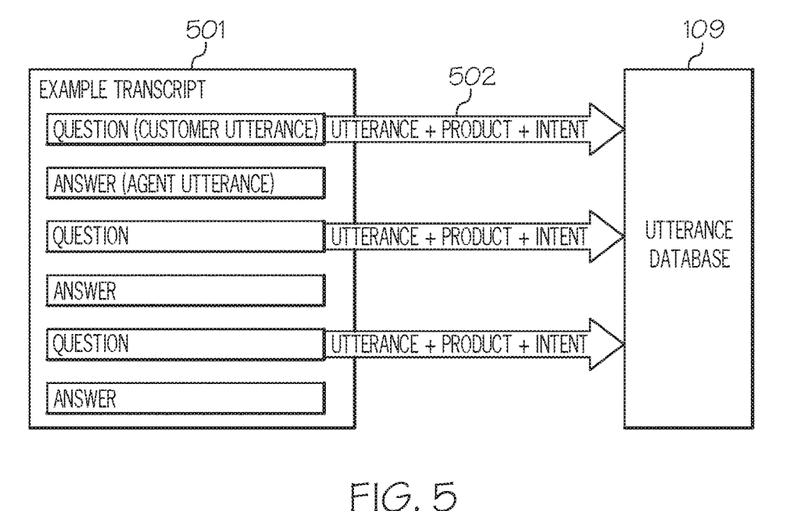
FIG. 5 is a diagram illustrating the dividing of the chat transcript data into categories in accordance with an embodiment of the present invention.
Figure 6:
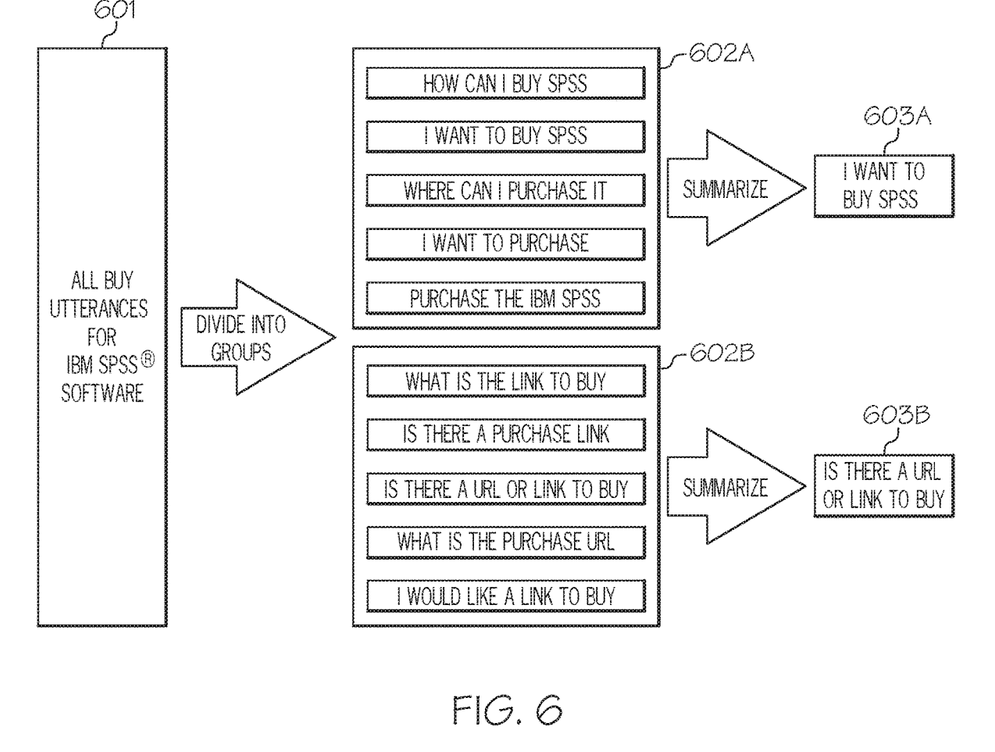
FIG. 6 is a diagram illustrating the dividing of the data of the chat transcripts into categories of utterances associated with intents in accordance with an embodiment of the present invention.
Figure 7:
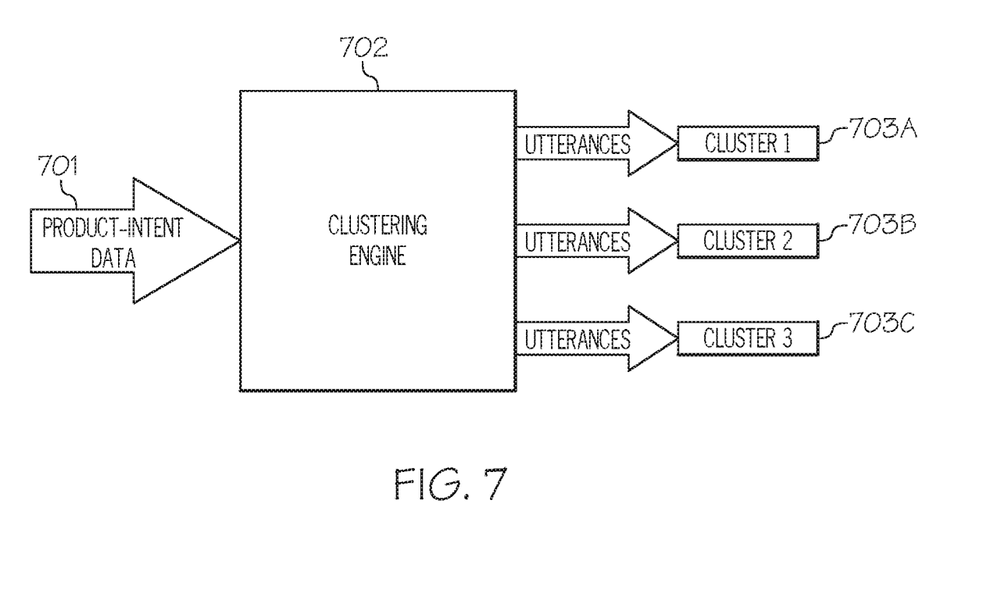
FIG. 7 is a diagram illustrating the clustering of the categories of utterances into clusters based on sentence similarity in accordance with an embodiment of the present invention.
Figure 8:
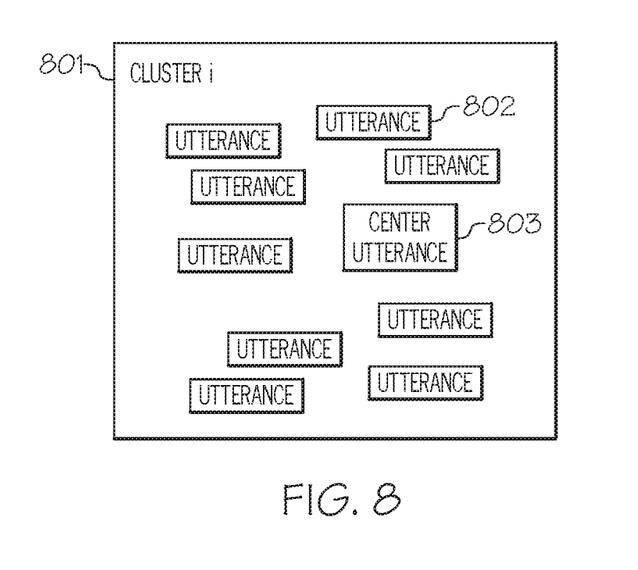
FIG. 8 is a diagram illustrating a representative utterance from a cluster of utterances in accordance with an embodiment of the present invention.
Figure 9:
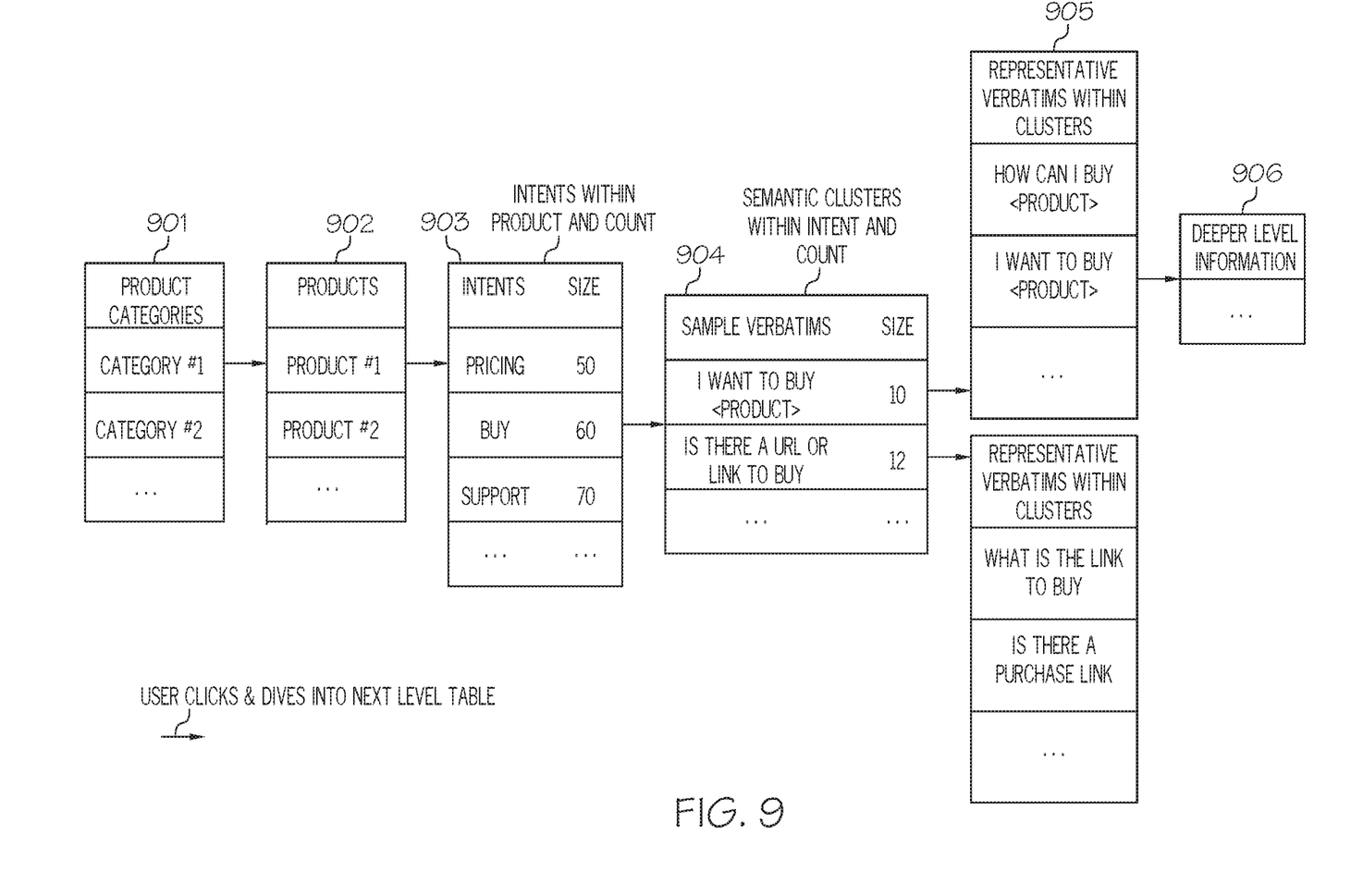
FIG. 9 is a diagram illustrating the hierarchical levels of information obtained by a user from interacting with the chat transcript analyzer to understand the chat transcript in accordance with an embodiment of the present invention.
Figure 10:
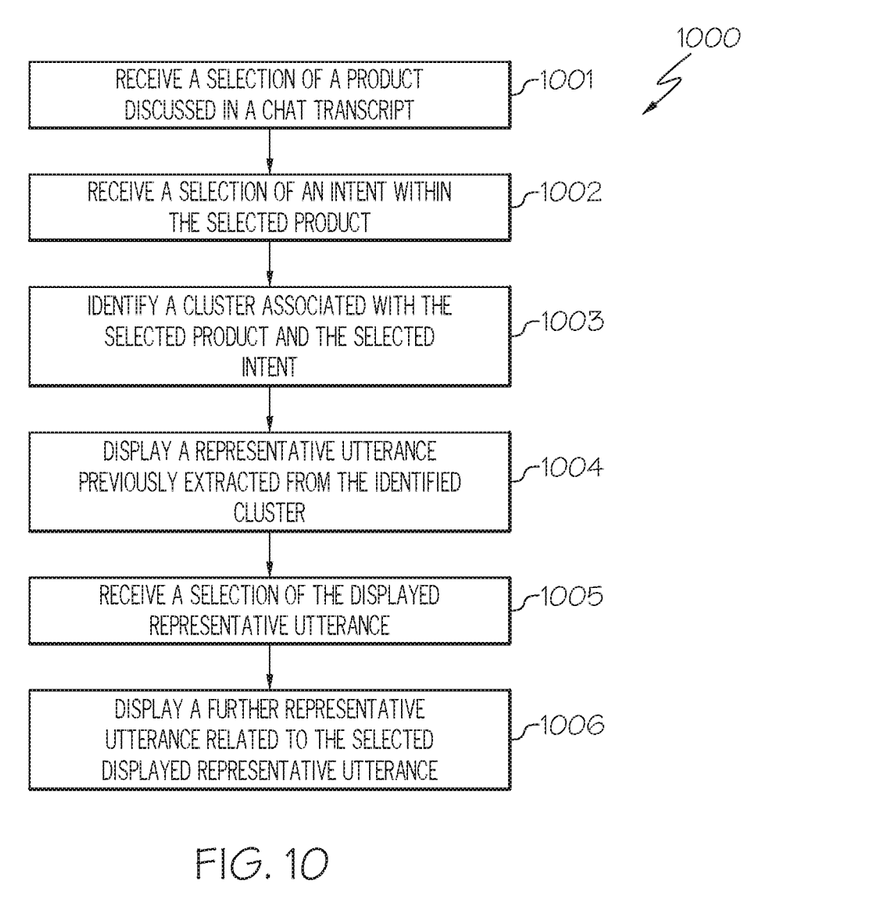
FIG. 10 is a flowchart of a method for a user to obtain representative utterances for selected products and intents from a chat transcript in accordance with an embodiment of the present invention.

The embodiments of the present invention provide a means for improving the understanding of chat transcript data by classifying utterances of the chat transcript data into products, intents and clusters as discussed below in connection with FIGS. 3-10. FIG. 3 is a flowchart of a method for generating a chat transcript. FIG. 4 is a flowchart of a method for improving the understanding of chat transcript data by classifying utterances of the chat transcript data into products, intents and clusters. FIG. 5 is a diagram illustrating the dividing of the chat transcript data into categories. FIG. 6 is a diagram illustrating the dividing of the data of the chat transcripts into categories of utterances associated with intents. FIG. 7 is a diagram illustrating the clustering of the categories of utterances into clusters based on sentence similarity. FIG. 8 is a diagram illustrating a representative utterance from a cluster of utterances. FIG. 9 is a diagram illustrating the hierarchical levels of information obtained by a user from interacting with the chat transcript analyzer to understand the chat transcript. FIG. 10 is a flowchart of a method for a user to obtain representative utterances for selected products and intents from a chat transcript.

As stated above, FIG. 3 is a flowchart of a method 300 for generating a chat transcript in accordance with an embodiment of the present invention.

Referring to FIG. 3, in conjunction with FIGS. 1-2, in step 301, chat transcript analyzer 107 monitors communications, such as online chat communications between customers 101 and agents 101. "Customers," as used herein, refer to any person or organization that buys goods or services from a business. "Agents," as used herein, refer to any person who acts on behalf of an organization (e.g., business) or another person. In one embodiment chat transcript analyzer 107 utilizes monitoring software, such as Geneysis™ Desktop, to monitor such online chat communications. "Online chat communications," as used herein, refer to any type of communication over a network (e.g., network 103) between users 101 that includes text, images, audio and/or video.

In step 302, chat transcript analyzer 107 generates a chat transcript, which may include text messages and/or text converted from audio, based on the monitored communicates. In one embodiment, chat transcript analyzer 107 may utilize transcription software (e.g., IBM Watson®, Express Scribe, Dragon® Naturally Speaking, InqScribe®, Audiotranskription) to convert audio (e.g., human speech from a voice chat) into a chat transcript. Furthermore, chat transcription analyzer 107 may utilize transcription software (e.g., Pure Chat®, Salesforce® Live Agent) to generate chat transcripts of online chat sessions (e.g., exchange of text messages between users 101, such as customers and agents). "Chat transcripts," as used herein, refer to a printed version of the online communication between users 101, such as between customers and agents. Such chat transcripts may include customer's questions and the agent's answers to such questions. Each of these questions and answers may be referred to herein as an "utterance," where an "utterance," as used herein, refers to a word or statement provided by a user 101, such as a customer or agent.

Once these chat transcripts are generated, chat transcript analyzer 107 analyzes such transcripts using the principles of the present invention that improves the understanding of such chat transcript data as discussed below in connection with FIG. 4.

FIG. 4 is a flowchart of a method 400 for improving the understanding of chat transcript data by classifying utterances of the chat transcript data into products, intents and clusters in accordance with an embodiment of the present invention.

Referring to FIG. 4, in conjunction with FIGS. 1-3, in step 401, chat transcript analyzer 107 analyzes the chat transcripts to classify utterances into intents. As discussed above, these utterances in the chat transcript may correspond to questions from customers and answers from agents. "Intents," as used herein, refer to the intentions, such as of customers, to take particular actions. For example, the customer may intend to purchase a red jacket.

In one embodiment, chat transcript analyzer 107 utilizes a natural language classifier (e.g., IBM Watson® Natural Language Classifier) that has been trained using a supervised learning method (e.g., support vector machine algorithm) to classify utterances into common customer intents.

In step 402, chat transcript analyzer 107 analyzes the chat transcripts to identify products discussed in the analyzed chat transcripts. In one embodiment, chat transcript analyzer 107 utilizes natural language processing to identify keywords that correspond to products discussed in the analyzed chat transcripts. In one embodiment, chat transcript analyzer 107 may utilize a listing of keywords that are associated with products of interest. Chat transcript analyzer 107 may then identify products of interests in the analyzed chat transcripts based on identifying the associated keywords from the list. Such a listing may reside in a data structure that is stored in a memory or a storage unit of chat transcript analyzer 107 (e.g., memory 205, disk unit 208).

In step 403, chat transcript analyzer 107 divides the data of the chat transcripts into categories of utterances associated with the identified products (see step 402) and identified intents (see step 401) by applying tags to the chat transcripts. In one embodiment, such tags are applied as filters to divide the data into categories. For example, a tag may group an utterance (e.g., question) with a product and an intent as shown in FIGS. 5 and 6.

FIG. 5 is a diagram illustrating the dividing of the chat transcript data into categories in accordance with an embodiment of the present invention. Referring to FIG. 5, chat transcript 501 may include various utterances, such as questions from the customers (customer utterances) and answers from the agents (agent utterances). In one embodiment, the principles of the present invention group the questions asked by the customers and reveal a summary question from that group as discussed further below. As a result, chat transcript analyzer 107 may apply a tag 502 corresponding to a customer utterance along with a product and an intent associated with the customer utterance. For example, the customer may have expressed a question regarding what is the link to buy IBM SPSS® software. In this example, the utterance refers to the question regarding the link to buy the software, the product refers to the IBM SPSS® software, and the intent is to buy. Such utterances along with the tags are stored in database 109 as shown in FIG. 5. In one embodiment, these tags are applied as filters to divide the chat transcript into categories, such as wanting to buy IBM SPSS® software and looking for a URL or link to buy IBM SPSS® software.

Referring now to FIG. 6, FIG. 6 is a diagram illustrating the dividing of the data of the chat transcripts into categories of utterances associated with the identified intents (see step 401) in accordance with an embodiment of the present invention.

As shown in FIG. 6, embodiments of the present invention divide the chat transcript data (all buy utterances for IBM SPSS® software 601) into categories or groups 602A, 602B. For example, category 602A may include utterances, such as customer questions, in a category for wanting to buy IBM SPSS® software. In another example, category 602B may include utterances, such as customer questions, in a category for looking for a URL or link to buy IBM SPSS® software.

After grouping the utterances, such as customer questions, embodiments of the present invention may summarize an utterance from that group/category, such as a summary question. For instance, summary question 603A ("I want to buy SPSS®") corresponds to a summary question of the utterances from category 602A. In another example, summary question 803B ("Is there a URL or link to buy") corresponds to a summary question of the utterances from category 602B.

Returning to FIG. 4, in conjunction with FIGS. 1-3 and 5-6, in step 404, chat transcript analyzer 107 clusters the categories of utterances associated with products and intents into clusters based on sentence similarity. In one embodiment, chat transcript analyzer 107 clusters the categories of utterances associated with products and intents into clusters using hierarchical and k-means clustering. In one embodiment, chat transcript analyzer 107 clusters the categories of utterances associated with products and intents into clusters based on sentence similarity using term frequency-inverse document frequency.

For example, referring now to FIG. 7 which is a diagram illustrating the clustering of the categories of utterances into clusters based on sentence similarity in accordance with an embodiment of the present invention, product-intent data 701 of the categories of utterances is clustered by a clustering engine 702 configured to cluster the categories of utterances into clusters 703A-703C (identified as "Cluster 1," "Cluster 2," and "Cluster 3," respectively, in FIG. 7). Clusters 703A-703C may collectively or individually be referred to as clusters 703 or cluster 703, respectively. In one embodiment, clustering engine 702 is a software tool (e.g., Carrot$^2$) configured to cluster the categories of utterances into clusters 703 based on sentence similarity. "Sentence similarity," as used herein, refers to the semantic similarity between two sentences or short texts. Such sentence similarity may be identified utilizing natural language processing (e.g., WordNet based word similarity)

Returning now to FIG. 4, in conjunction with FIGS. 1-3 and 5-7, once the utterances are grouped, in step 405, chat transcript analyzer 107 extracts a representative utterance (e.g., summary question from customers) from a cluster, where the representative utterance is an utterance with the highest semantic similarity to the utterances in the cluster as shown in FIG. 7. In this manner, the understanding of the chat transcript data is improved by providing a more complete understanding of the chat transcript data, as opposed to simply summarizing the conversation topics, while reducing the amount of computing resources (e.g., processing resources) that are utilized to attempt to understand the chat transcript data.

Referring now to FIG. 8, FIG. 8 is a diagram illustrating a representative utterance from a cluster of utterances in accordance with an embodiment of the present invention. As shown in FIG. 8, a cluster, such as cluster i 801, includes various utterances 802. One of these utterances 802 is designated as the "center utterance" 803, which corresponds to the "representative utterance" that is an utterance that has the highest semantic similarity to the utterances in the cluster. "Semantic similarity," as used herein, refers to the similarity in meaning or content. In one embodiment, semantic similarity is determined using semantic similarity algorithms, such as WordNet Similarity, corpus-based similarity algorithms and knowledge-based similarity algorithms. Rather than manually reviewing each of the utterances in an attempt to understand the chat transcript data or rather than utilizing current chat transcript analysis tools to summarize the conversation topics of these utterances, a representative utterance may be extracted that provides more accurate guidance as to the understanding of the chat transcript data in a more efficient manner (using fewer computing resources) than current chat transcript analysis tools.

Returning to FIG. 4, in conjunction with FIGS. 1-3 and 5-8, in step 406, in certain situations where the chat transcript data is large enough, chat transcript analyzer 107 iteratively examines for sub-clusters and their respective representative utterances within that cluster.

A user 108, such as an analyst, may interact with chat transcript analyzer 107 via a graphical user interface, such as being able to view difference levels of a table, as discussed below in connection with FIG. 9.

FIG. 9 is a diagram illustrating the hierarchical levels of information obtained by a user from interacting with chat transcript analyzer 107 (FIGS. 1 and 2) to understand the chat transcript in accordance with an embodiment of the present invention.

Referring to FIG. 9, in conjunction with FIGS. 1-8, a user 108, such as an analyst, may interact with chat transcript analyzer 107 via a graphical user interface, such as being able to view difference levels of a table. For instance, chat transcript analyzer 107 may display product categories 901 (e.g., category #1, category #2, etc.). After user 108 selects a product category from product categories 901, chat transcript analyzer 107 may display products 902 (e.g., product #1, product #2, etc.) for that selected product category. Such products may be identified by chat transcript analyzer 107 as discussed above in connection with step 402 of FIG. 4.

After user 108 selects a product, chat transcript analyzer 107 may display intents 903 within the selected product (e.g., pricing, buy, support, etc.) as well as the count (number of intents associated with the selected product). Such intents may be identified by chat transcript analyzer 107 as discussed above in connection with step 401 of FIG. 4.

After user 108 selects an intent, chat transcript analyzer 107 may display the semantic clusters 904 within the selected intent (e.g., "I want to buy <product>," "Is there a URL or link to buy," etc.) as well as the count (number of semantic clusters within the selected intent). Such semantic clusters may be identified by chat transcript analyzer 107 as discussed above in connection with step 404 of FIG. 4.

After user 108 selects a semantic cluster, a representative utterance 905 (e.g., "How can I buy <product>," "I want to buy <product>," "What is the link to buy," "Is there a purchase link," etc.) is extracted from the selected cluster. Such a representative utterance may be identified by chat transcript analyzer 107 as discussed above in connection with step 405 of FIG. 4.

As discussed above, in situations where the chat transcript data is large enough, chat transcript analyzer 107 may iteratively examine for sub-clusters and their respective representative utterances within that cluster after user 108 selects such a cluster as shown in FIG. 9 by the available deeper level information 906.

A more detailed description regarding user 108 (e.g., analyst) obtaining representative utterances (e.g., summary question from customers) for selected products and intents from a chat transcript is provided below in connection with FIG. 10.

FIG. 10 is a flowchart of a method 1000 for a user to obtain representative utterances for selected products and intents from a chat transcript in accordance with an embodiment of the present invention.

Referring to FIG. 10, in conjunction with FIGS. 1-9, in step 1001, chat transcript analyzer 107 receives a selection of a product discussed in the chat transcript as discussed above in connection with FIG. 9 (see 902 of FIG. 9).

In step 1002, chat transcript analyzer 107 receives a selection of an intent within the selected product as discussed above in connection with FIG. 9 (see 903 of FIG. 9).

In step 1003, chat transcript analyzer 107 identifies a cluster associated with the selected product and the selected intent as discussed above in connection with FIG. 9 (see 904 of FIG. 9).

In step 1004, chat transcript analyzer 107 displays a representative utterance previously extracted from the identified cluster as discussed above in connection with FIG. 9 (see 905 of FIG. 9).

In step 1005, chat transcript analyzer 107 receives a selection of the displayed representative utterance.

In situations where the chat transcript data is large enough, in step 1006, chat transcript analyzer 107 displays a further representative utterance related to the selected displayed representative utterance as discussed above in connection with FIG. 9 (see 906 of FIG. 9). In one embodiment, a tuned number of further representative utterances is displayed that is based on the amount of chat transcript data.

In this manner, the present invention improves the understanding of the chat transcript data by extracting a representative utterance based on intents that provides more accurate guidance as to the underlying meaning of the chat transcript data. That is, the present invention more efficiently (using fewer computing resources, such as processing resources) analyzes the chat transcript data as well as more accurately provides guidance as to the underlying meaning of the chat transcript data than current transcript analysis tools.

Furthermore, in this manner, the functionality or capability of computing systems is improved by more efficiently (using fewer computing resources, such as processing resources) analyzing the chat transcript data to provide a more accurate understanding of the chat transcript data than current chat transcript analysis tools. By reducing the amount of computing resources being utilized to understand the content of the chat transcripts, computing resources (e.g., processing resource) are more efficiently utilized.

Furthermore, the present invention improves the technology or technical field involving chat transcript analysis tools. As discussed above, currently existing chat transcript analysis tools simply attempt to summarize the conversation topics. However, such analysis fails to provide a complete understanding of the chat transcript data. As a result, users may have to manually analyze the raw transcript data. However, such data is often too large to sift through manually. Furthermore, manual analysis often results in anecdotal conclusions based on a small subset of the data.

The present invention improves such technology by classifying utterances into intents (e.g., common customer intents), identifying products discussed in the analyzed chat transcripts and applying tags to divide the data of the chat transcripts into categories of utterances associated with products and intents. After clustering the categories of utterances associated with products and intents into clusters based on sentence similarity, a representative utterance from a cluster may be extracted, where the representative utterance has the highest semantic similarity to the utterances in the cluster. In this manner, users will be provided a more accurate guide as to the underlying meaning of the chat transcript data, such as the main question being asked by customers in connection with specific products and intents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving understanding of chat transcript data, the method comprising:
   analyzing chat transcripts to classify utterances into intents;
   analyzing said chat transcripts to identify products discussed in said analyzed chat transcripts;
   dividing data of said chat transcripts into categories of utterances associated with said products and said intents by applying tags to said chat transcripts, wherein said intents comprise intentions of customers to take particular actions;
   clustering said categories of utterances associated with said products and said intents into clusters based on sentence similarity; and
   extracting a representative utterance from a cluster, wherein said representative utterance is an utterance that has a highest semantic similarity to utterances in said cluster.

2. The method as recited in claim 1, wherein said utterances are classified into said intents using a natural language classifier, wherein said products discussed in said analyzed chat transcripts are identified using natural language processing.

3. The method as recited in claim 1 further comprising:
   identifying a subsequent representative utterance from a sub-cluster within said cluster whose representative utterance was extracted.

4. The method as recited in claim 1 further comprising:
   receiving a selection of a product discussed in a chat transcript;
   receiving a selection of an intent within said selected product;
   identifying a cluster associated with said selected product and said selected intent; and
   displaying a representative utterance previously extracted from said identified cluster.

5. The method as recited in claim 4 further comprising:
   receiving a selection of said displayed representative utterance; and
   displaying a further representative utterance related to said selected displayed representative utterance.

6. The method as recited in claim 1, wherein said categories of utterances associated with said products and said intents are clustered into clusters using hierarchical and k-means clustering, wherein said categories of utterances associated with said products and said intents are clustered into clusters based on sentence similarity using term frequency-inverse document frequency.

7. The method as recited in claim 1, wherein said chat transcripts comprise text messages and/or text converted from audio.

8. A computer program product for improving understanding of chat transcript data, the computer program product comprising a computer readable storage medium having program code embodied therewith, the program code comprising the programming instructions for:
   analyzing chat transcripts to classify utterances into intents;
   analyzing said chat transcripts to identify products discussed in said analyzed chat transcripts;
   dividing data of said chat transcripts into categories of utterances associated with said products and said intents by applying tags to said chat transcripts, wherein said intents comprise intentions of customers to take particular actions;
   clustering said categories of utterances associated with said products and said intents into clusters based on sentence similarity; and
   extracting a representative utterance from a cluster, wherein said representative utterance is an utterance that has a highest semantic similarity to utterances in said cluster.

9. The computer program product as recited in claim 8, wherein said utterances are classified into said intents using a natural language classifier, wherein said products discussed in said analyzed chat transcripts are identified using natural language processing.

10. The computer program product as recited in claim 8, wherein the program code further comprises the programming instructions for:
    identifying a subsequent representative utterance from a sub-cluster within said cluster whose representative utterance was extracted.

11. The computer program product as recited in claim 8, wherein the program code further comprises the programming instructions for:
    receiving a selection of a product discussed in a chat transcript;
    receiving a selection of an intent within said selected product;
    identifying a cluster associated with said selected product and said selected intent; and
    displaying a representative utterance previously extracted from said identified cluster.

12. The computer program product as recited in claim 11, wherein the program code further comprises the programming instructions for:
    receiving a selection of said displayed representative utterance; and
    displaying a further representative utterance related to said selected displayed representative utterance.

13. The computer program product as recited in claim 8, wherein said categories of utterances associated with said products and said intents are clustered into clusters using hierarchical and k-means clustering, wherein said categories of utterances associated with said products and said intents are clustered into clusters based on sentence similarity using term frequency-inverse document frequency.

14. The computer program product as recited in claim 8, wherein said chat transcripts comprise text messages and/or text converted from audio.

15. A system, comprising:
a memory for storing a computer program for improving understanding of chat transcript data; and
a processor connected to said memory, wherein said processor is configured to execute the program instructions of the computer program comprising:
analyzing chat transcripts to classify utterances into intents;
analyzing said chat transcripts to identify products discussed in said analyzed chat transcripts;
dividing data of said chat transcripts into categories of utterances associated with said products and said intents by applying tags to said chat transcripts, wherein said intents comprise intentions of customers to take particular actions;
clustering said categories of utterances associated with said products and said intents into clusters based on sentence similarity; and
extracting a representative utterance from a cluster, wherein said representative utterance is an utterance that has a highest semantic similarity to utterances in said cluster.

16. The system as recited in claim 15, wherein said utterances are classified into said intents using a natural language classifier, wherein said products discussed in said analyzed chat transcripts are identified using natural language processing.

17. The system as recited in claim 15, wherein the program instructions of the computer program further comprise:
identifying a subsequent representative utterance from a sub-cluster within said cluster whose representative utterance was extracted.

18. The system as recited in claim 15, wherein the program instructions of the computer program further comprise:
receiving a selection of a product discussed in a chat transcript;
receiving a selection of an intent within said selected product;
identifying a cluster associated with said selected product and said selected intent, and
displaying a representative utterance previously extracted from said identified cluster.

19. The system as recited in claim 18, wherein the program instructions of the computer program further comprise:
receiving a selection of said displayed representative utterance; and
displaying a further representative utterance related to said selected displayed representative utterance.

20. The system as recited in claim 15, wherein said categories of utterances associated with said products and said intents are clustered into clusters using hierarchical and k-means clustering, wherein said categories of utterances associated with said products and said intents are clustered into clusters based on sentence similarity using term frequency-inverse document frequency.

\* \* \* \* \*